(12) United States Patent
Wilson

(10) Patent No.: US 11,140,803 B2
(45) Date of Patent: Oct. 12, 2021

(54) SYSTEM AND METHOD FOR ROTATIONALLY DRIVING GROUND ENGAGING TOOLS OF AN AGRICULTURAL IMPLEMENT

(71) Applicant: CNH Industrial America LLC, New Holland, PA (US)

(72) Inventor: Andrew Wilson, Allison Park, PA (US)

(73) Assignee: CNH Industrial America LLC, New Holland, PA (US)

( * ) Notice: Subject to any disclaimer, the term of this patent is extended or adjusted under 35 U.S.C. 154(b) by 211 days.

(21) Appl. No.: 16/571,594

(22) Filed: Sep. 16, 2019

(65) Prior Publication Data

US 2021/0076552 A1   Mar. 18, 2021

(51) Int. Cl.
*A01B 33/08* (2006.01)
*A01B 33/02* (2006.01)
(Continued)

(52) U.S. Cl.
CPC ............ *A01B 33/082* (2013.01); *A01B 15/18* (2013.01); *A01B 33/024* (2013.01); *A01B 35/28* (2013.01);
(Continued)

(58) Field of Classification Search
CPC ..... A01B 33/024; A01B 33/082; A01B 79/00; A01B 15/16; A01B 15/18
See application file for complete search history.

(56) References Cited

U.S. PATENT DOCUMENTS 4,199,030 A   4/1980 Chance
4,391,154 A * 7/1983 Tortella ................ A01B 33/082
                                              172/125
(Continued)

FOREIGN PATENT DOCUMENTS

DE   102014104019   4/2015
WO   WO2013118085   8/2013

OTHER PUBLICATIONS

Nalavade, Parish, P. et al., "Development of a Powered Disc Harrow for On-Farm Crop Residue Management," International Agricultural Engineering Journal, vol. 22, Issue 1, Mar. 1, 2013, pp. 49-60.

(Continued)

*Primary Examiner* — Jessica H Lutz
(74) *Attorney, Agent, or Firm* — Rebecca L. Henkel; Rickard K. DeMille

(57) ABSTRACT

A system for rotationally driving ground engaging tools of an agricultural implement may include a rotational actuator configured to rotationally drive a ground engaging tool of the implement about a rotational axis. A controller may be configured to determine a current ground speed of the implement based on data received from a sensor. Moreover, the controller may be further configured to determine a rotational output for the rotational actuator based on the current ground speed of the implement such that the tool rotates at a predetermined rotational speed relative to soil within a field. In addition, the controller may be configured to control the operation of the rotational actuator such that the actuator provides the determined rotational output to the tool while the tool is disposed at a working position relative to a soil surface of the field.

19 Claims, 6 Drawing Sheets

(51) Int. Cl.
    *A01B 35/28*     (2006.01)
    *A01B 35/32*     (2006.01)
    *A01B 15/18*     (2006.01)
    *A01B 51/02*     (2006.01)
    *A01B 79/00*     (2006.01)

(52) U.S. Cl.
    CPC .............. *A01B 35/32* (2013.01); *A01B 51/02* (2013.01); *A01B 79/00* (2013.01)

(56) References Cited

U.S. PATENT DOCUMENTS

| | | | |
|---|---|---|---|
| 4,499,747 A * | 2/1985 | Ewers | A01B 33/024 172/55 |
| 4,519,459 A * | 5/1985 | Reaume | A01B 33/082 172/125 |
| 6,497,294 B2 | 12/2002 | Vought | |
| 8,408,324 B2 | 4/2013 | Peter | |
| 8,490,371 B2 * | 7/2013 | Roberge | A01D 34/665 56/10.2 R |
| 8,931,245 B2 | 1/2015 | Roberge | |
| 9,241,440 B2 * | 1/2016 | Roberge | A01D 41/141 |
| 9,485,907 B2 | 11/2016 | Oehler et al. | |
| 9,706,701 B2 | 7/2017 | Prickel et al. | |
| 9,949,434 B2 | 4/2018 | Baes et al. | |
| 9,979,338 B2 | 5/2018 | Dollinger et al. | |
| 1,023,137 A1 | 3/2019 | Dillon | |
| 10,813,265 B2 * | 10/2020 | Stanhope | A01B 63/1115 |
| 10,959,363 B2 * | 3/2021 | Kornecki | A01B 63/008 |
| 2010/0263579 A1 * | 10/2010 | Dillon | A01B 19/10 111/139 |
| 2011/0120356 A1 * | 5/2011 | Wendte | A01C 7/046 111/130 |
| 2013/0197767 A1 * | 8/2013 | Lenz | A01B 79/00 701/50 |
| 2018/0210450 A1 * | 7/2018 | Ferrari | H04N 7/181 |
| 2018/0352718 A1 * | 12/2018 | Kovach | A01B 49/027 |
| 2019/0039431 A1 * | 2/2019 | Vaughan | B60G 21/026 |
| 2020/0107494 A1 * | 4/2020 | Schoeny | A01C 7/205 |
| 2020/0107498 A1 * | 4/2020 | Anderson | A01C 5/064 |
| 2020/0337213 A1 * | 10/2020 | Schoeny | A01B 79/005 |
| 2020/0355667 A1 * | 11/2020 | Schoeny | A01B 15/16 |
| 2021/0127552 A1 * | 5/2021 | Hubner | A01B 69/024 |

OTHER PUBLICATIONS

Nalavade, Parish, P. et al., "Performance of Free Rolling and Powered Tillage Discs," Soil and Tillage Research, vol. 109, Issue 2, Aug. 2010, pp. 87-93.

Shinners, K.J., et al., "Combining Active and Passive Tillage Elements to Reduce Draft Requirements," American Society of Agricultural and Biological Engineers, vol. 33, Issue 2, 1990, p. 400-404.

\* cited by examiner

SYSTEM AND METHOD FOR ROTATIONALLY DRIVING GROUND ENGAGING TOOLS OF AN AGRICULTURAL IMPLEMENT

FIELD OF THE INVENTION

The present disclosure generally relates to agricultural implements and, more particularly, to systems and methods for rotationally driving ground engaging tools of an agricultural implement while such tools are disposed at working positions relative to the soil surface of a field.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include one or more ground engaging tools configured to rotate relative to the soil as the implement is moved across the field. For example, in certain configurations, the implement may include one or more harrow disks, leveling disks, rolling baskets, and/or the like. Such rotating ground engaging tool(s) loosen and/or otherwise agitate the soil to prepare the field for subsequent planting operations.

As the implement is moved across the field, the friction generated between the rotating ground engaging tools and the soil causes the tools to rotate relative to the soil. In this regard, the speed at which the ground engaging tools rotate relative to the soil is controlled by the ground speed of the implement. For example, when the ground speed of the implement is increased, the rotational speed of the ground engaging tools also increases. Conversely, the rotational speed of the ground engaging tools decreases when the ground speed of the implement decreases. As such, the implement is typically moved across the field at a ground speed that rotates the ground engaging tools at a desired or specified rotational speed such that the tillage operation provides the desired loosening/agitation of the soil. However, variations in the conditions across the field may necessitate adjustments to the ground speed of the implement such that the ground engaging tools are no longer rotating at the desired rotational speed.

Accordingly, an improved system and method for rotationally driving the ground engaging tools of an agricultural implement to allow for the rotational speed of the tools to be varied independent of the implement ground speed would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for rotationally driving ground engaging tools of an agricultural implement. The system may include a ground engaging tool configured to be supported relative to a frame of an agricultural implement. Additionally, the system may include a rotational actuator configured to rotationally drive the ground engaging tool about a rotational axis. Furthermore, the system may include a sensor configured to capture data indicative of a ground speed of the agricultural implement and a controller communicatively coupled to the rotational actuator and the sensor. As such, the controller may be configured to determine a current ground speed of the agricultural implement based on data received from the sensor. Moreover, the controller may be further configured to determine a rotational output for the rotational actuator based on the current ground speed of the agricultural implement such that the ground engaging tool rotates at a predetermined rotational speed relative to soil within a field. In addition, the controller may be configured to control the operation of the rotational actuator such that the rotational actuator provides the determined rotational output to the ground engaging tool while the ground engaging tool is disposed at a working position relative to a soil surface of the field.

In another aspect, the present subject matter is directed to an agricultural implement. The agricultural implement may include a frame and first and second ground engaging tools supported relative to the frame. The agricultural implement may also include a first rotational actuator configured to rotationally drive the first ground engaging tool about a first rotational axis. Additionally, the agricultural implement may include a second rotational actuator configured to rotationally drive the second ground engaging tool about a second rotational axis, with the second rotational axis being different than the first rotational axis. Furthermore, the agricultural implement may include a sensor configured to capture data indicative of a ground speed of the agricultural implement. Moreover, the agricultural implement may include a controller communicatively coupled to the first rotational actuator, the second rotational actuator, and the sensor. As such, the controller configured to determine a current ground speed of the agricultural implement based on data received from the sensor. In addition, the controller may be configured to control an operation of the first rotational actuator based on the current ground speed to rotationally drive the first ground engaging tool such that the first ground engaging tool rotates at a first rotational speed relative to soil within a field. Furthermore, the controller may be configured to control an operation of the second rotational actuator based on the current ground speed to rotationally drive the second ground engaging tool such that the second ground engaging tool rotates at a second rotational speed relative to soil within the field. The first and second ground engaging tools may be rotationally driven by the first and second rotational actuators, respectively, while the first and second ground engaging tools are disposed at respective working positions relative to a soil surface of the field.

In a further aspect, the present subject matter is directed to a method for rotationally driving ground engaging tools of an agricultural implement. The agricultural implement may include a frame and a ground engaging tool configured to be supported relative to the frame. The method may include receiving, with one or more computing devices, data indicative of a current ground speed of the agricultural implement. Furthermore, the method may include determining, with the one or more computing devices, a rotational output for a rotational actuator coupled to the ground engaging tool based on the current ground speed of the agricultural implement such that the ground engaging tool rotates at a predetermined rotational speed relative to soil within a field. Additionally, the method may include controlling, with the one or more computing devices, an operation of the rotational actuator such that the rotational actuator provides the determined rotational output to the ground engaging tool while the ground engaging tool is disposed at a working position relative to a soil surface of the field.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
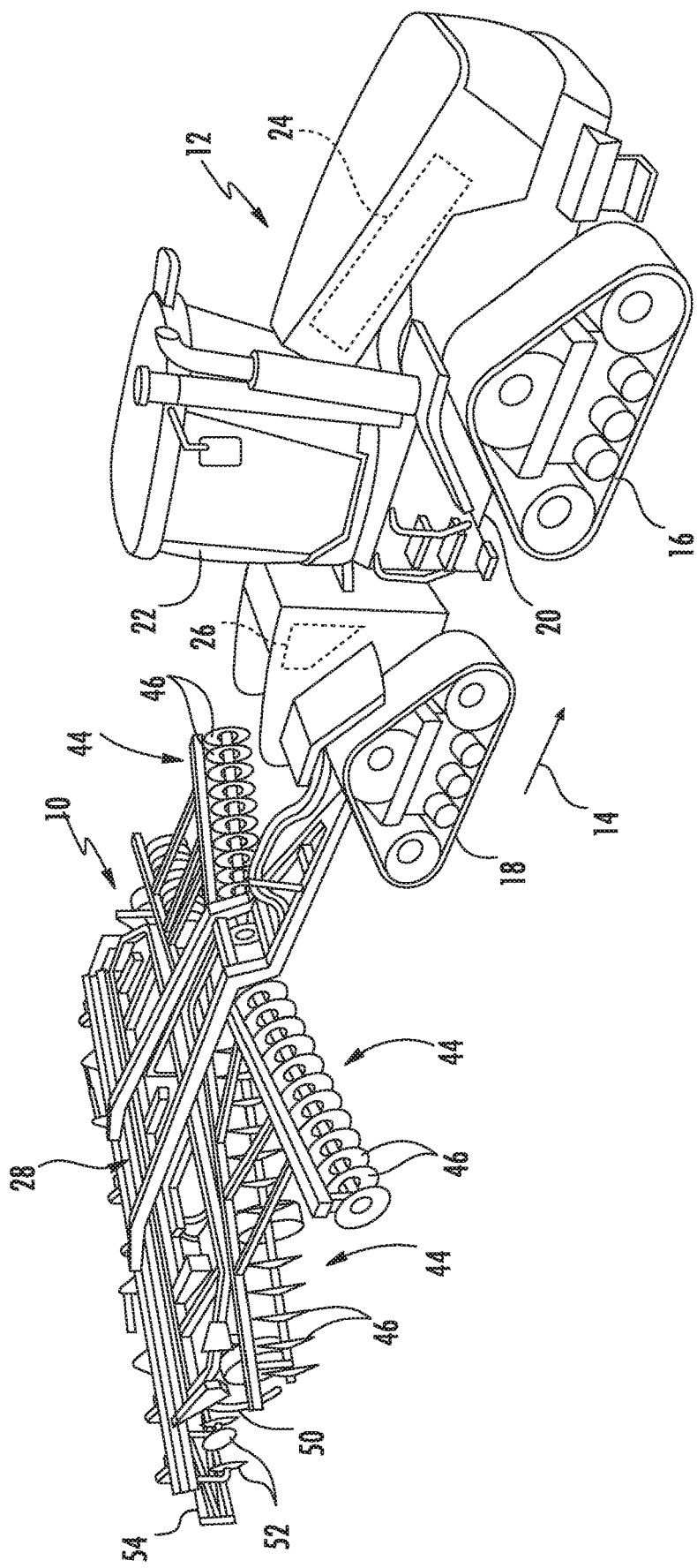
FIG. 1 illustrates a perspective view of one embodiment of an agricultural implement coupled to a work vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for rotationally driving ground engaging tools of an agricultural implement. Specifically, in several embodiments, a rotational actuator, such as a hydraulic or electric motor, may be coupled to one or more ground engaging tools (e.g., one or disk blades and/or baskets) of an agricultural implement to allow the tools to be rotationally driven about their rotational axis while such tools are maintained at their lowered or working position (i.e., while the tools are engaging the ground). In such embodiments, a controller of the disclosed system may be configured to receive data indicative of the current ground speed of the agricultural implement from a ground speed sensor. Furthermore, the controller may be configured to determine a rotational output for the rotational actuator coupled to the ground engaging tool(s) based on the current ground speed of the implement such that the tool(s) rotates at a predetermined rotational speed relative to the soil within the field that is set for the agricultural operation being performed. For example, the rotational output of the rotational actuator may be determined or selected such that the cumulative effect of the torque or rotational driving force provided by the rotational actuator and the friction generated by the engagement of the tool(s) with the soil results in the tool(s) rotating at the predetermined rotational speed. Thereafter, the controller may be configured to control the operation of the rotational actuator such that the rotational actuator provides the determined rotational output to the ground engaging tool(s) while the tool(s) is disposed at a working position relative to a soil surface of a field.

In accordance with aspects of the present subject matter, the disclosed systems and method may allow the ground engaging tool(s) of the agricultural implement to rotate relative to the soil in the field at a rotational speed independent of the ground speed of the implement. For example, moving the agricultural implement across the field at six miles per hour (without rotationally driving the tool(s)) may result in the ground engaging tool(s) rotating at a rotational speed specified or desired for certain agricultural operations. However, the conditions of the field may require that the implement be moved across the field at four miles per hour to prevent plugging or material accumulation on the ground engaging tool(s) and/or for any other suitable reasons. In such instances, unpowered or non-rotationally driven ground engaging tools may rotate too slowly relative to the soil to adequately perform the agricultural operation. As such, by utilizing the disclosed system and method, the ground engaging tool(s) may be rotationally driven by the rotational actuator(s) such that, when the implement is being moved across the field at four miles per hour, the ground engaging tool(s) rotate relative to the soil at the same rotational speed as the tool(s) would if the implement were being moved at six miles per hour.

Figure 2:
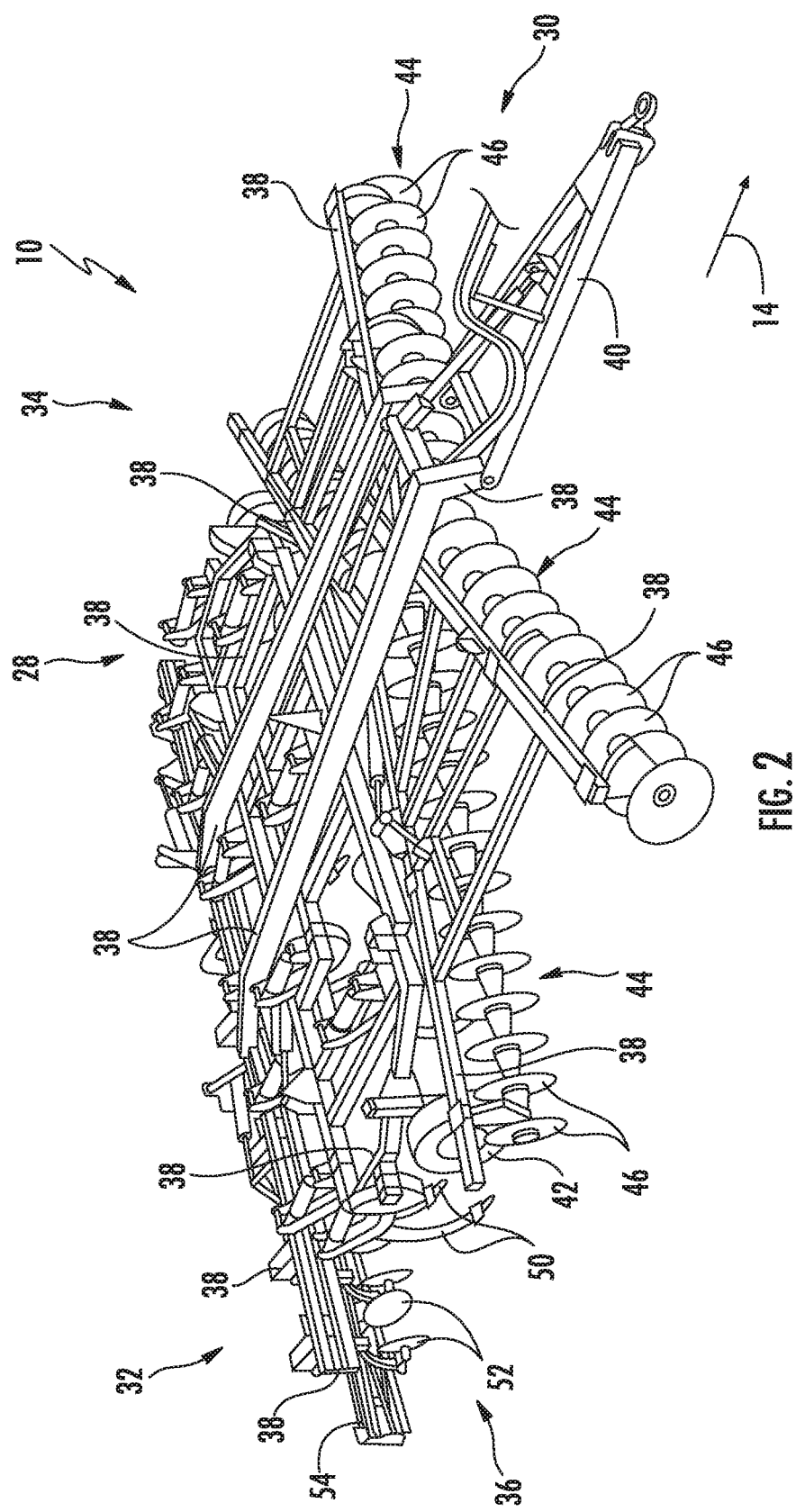
FIG. 2 illustrates another perspective view of the agricultural implement shown in FIG. 1 in accordance with aspects of the present subject matter.

Referring now to the drawings, FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices for permitting an operator to control the operation of one or more components of the work vehicle 12 and/or one or more components of the implement 10. Additionally, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown in FIGS. 1 and 2, the implement 10 may include a frame 28. More specifically, the frame 28 may extend longitudinally between a forward end 30 and an aft end 32. The frame 28 may also extend laterally between a first side 34 and a second side 36. In this respect, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (one is shown) may be coupled to the frame 28 to facilitate towing the implement 10 in the direction of travel 14.

In several embodiments, the frame 28 may be configured to support one or more gangs or sets 44 of disk blades 46. Each disk blades 46 may, in turn, be configured to penetrate into or otherwise engage the soil as the implement 10 is being pulled through the field. In this regard, the various disk gangs 44 may be oriented at an angle relative to the direction of travel 14 to promote more effective tilling of the soil. In the embodiment shown in FIGS. 1 and 2, the implement 10 includes four disk gangs 44 supported on the frame 28 adjacent to its forward end 30. However, it should be appreciated that, in alternative embodiments, the implement 10 may include any other suitable number of disk gangs 44, such as more or fewer than four disk gangs 44. Furthermore, in one embodiment, the disk gangs 44 may be mounted to the frame 28 at any other suitable location, such as adjacent to its aft end 32.

Additionally, as shown, in one embodiment, the implement frame 28 may be configured to support other ground engaging tools. For instance, in the illustrated embodiment, the frame 28 is configured to support a plurality of shanks 50 configured to rip or otherwise till the soil as the implement 10 is towed across the field. Furthermore, in the illustrated embodiment, the frame 28 is also configured to support a plurality of leveling blades 52. Moreover, as shown, the frame 28 may be configured to support a plurality of rolling baskets or rotary firming wheels 54 (one is shown). In general, the baskets 54 may be configured to break up or otherwise reduce the number and/or size of soil clods present on the surface of the field and/or firm the soil over which the implement 10 travels. However, in other embodiments, any other suitable ground-engaging tools may be coupled to and supported by the implement frame 28, such as a plurality closing disks.

It should be appreciated that the configuration of the implement 10 and the work vehicle 12 described above and shown in FIGS. 1 and 2 is provided only to place the present subject matter in an exemplary field of use. Thus, it should be appreciated that the present subject matter may be readily adaptable to any manner of implement and/or work vehicle configuration.

Figure 3:
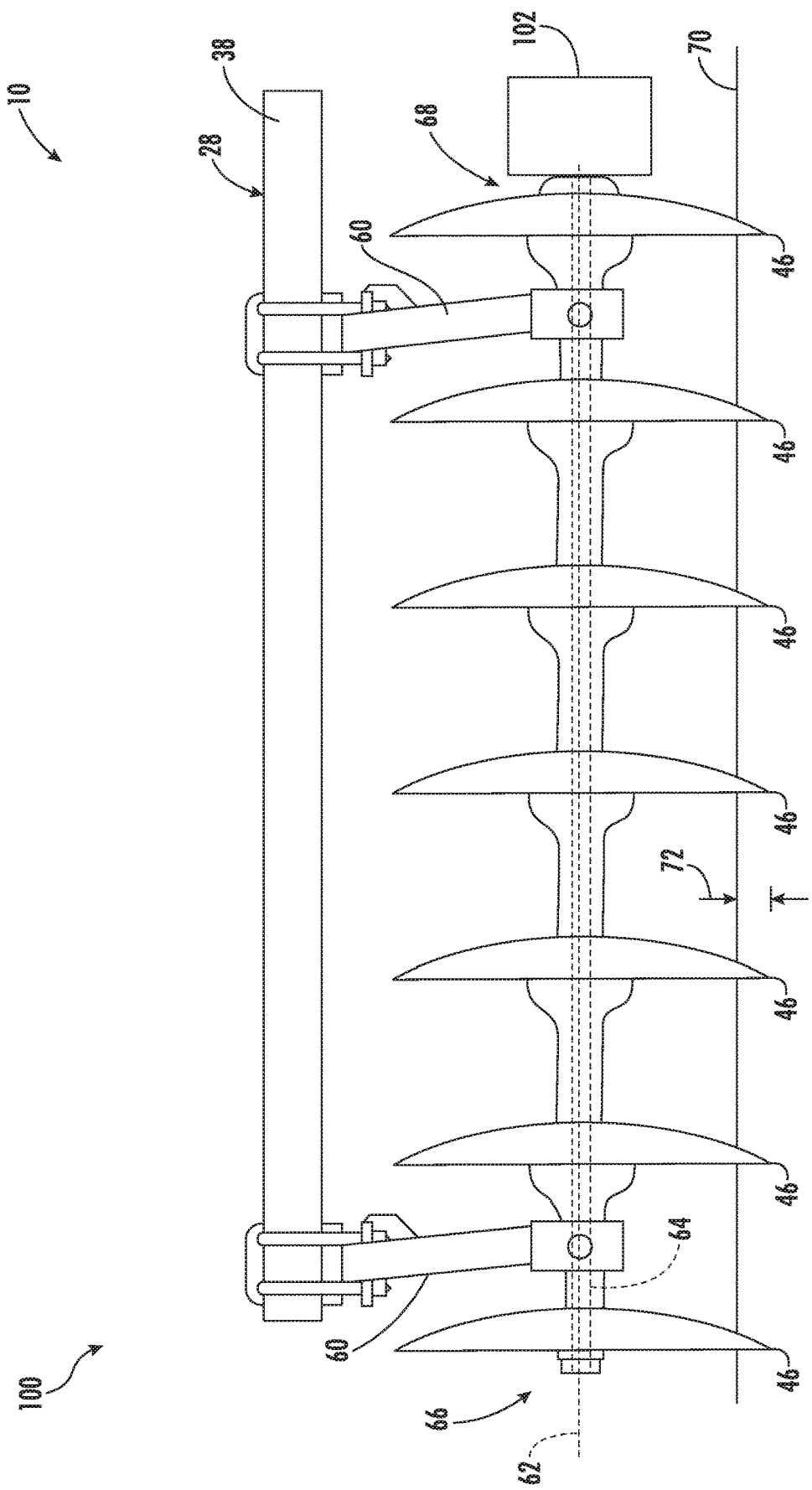
FIG. 3 illustrates a view of one embodiment of a system for rotationally driving ground engaging tools of an agricultural implement in accordance with aspects of the present subject matter, particularly illustrating various system components installed relative to a disk gang of the agricultural implement for rotationally driving the disk blades of the disk gang relative to the soil.
Figure 4:
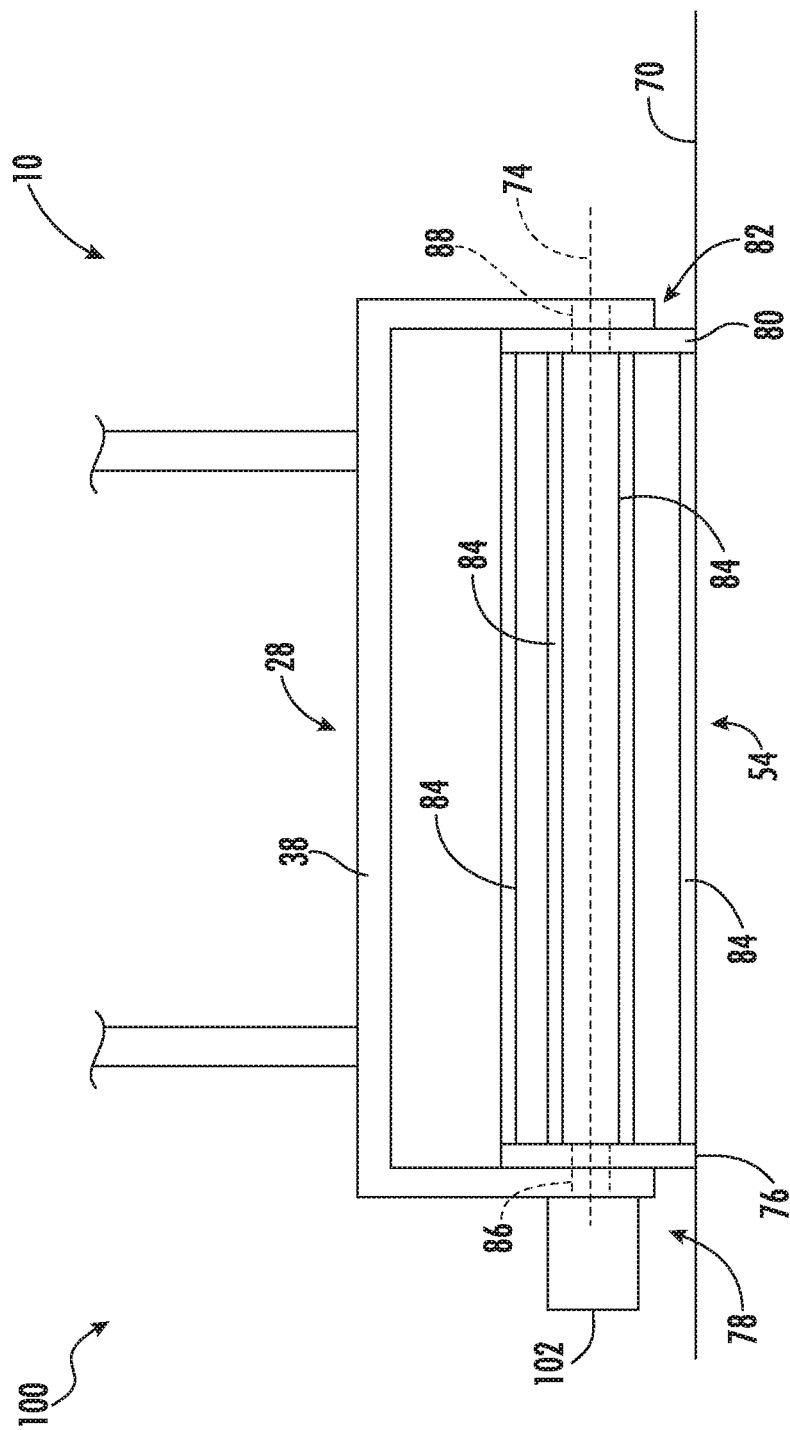
FIG. 4 illustrates another view of the system for rotationally driving ground engaging tools of an agricultural implement shown in FIG. 3, particularly illustrating various system components installed relative to a basket of the agricultural implement for rotationally driving the basket relative to the soil.

Referring now to FIGS. 3 and 4, simplified views of one embodiment of a system 100 for rotationally driving ground engaging tools of an agricultural implement is illustrated in accordance with aspects of the present subject matter. For purposes of discussion, the system 100 will generally be described herein with reference to one of the disk gangs 44 and the baskets 54 of the implement 10 described above with reference to FIGS. 1 and 2. However, in other embodiments, the system 100 may be utilized for rotationally driving any other suitable rotating ground engaging tools having any other suitable tool configuration.

As shown in FIG. 3, the disk gang 44 may be configured to be supported relative to a toolbar or frame member 38 of the implement frame 28 via one or more hangers 60 for rotation relative to the ground about a rotational axis 62. Additionally, the disk gang 44 includes a disk gang shaft 64 (also referred to herein as a common shaft) extending axially along the rotational axis 62 between a first shaft end 66 and a second shaft end 68. As shown, the disk blades 46 of the disk gang 44 are rotatably coupled to the disk gang shaft 64 for rotation with the shaft 64 about the rotational axis 62. Thus, as the implement 10 is moved across a field with the disk gang 44 positioned at its lowered or working position, the disk blades 46 may be configured to penetrate the soil surface (e.g., as indicated by line 70 in FIG. 3) of the field and rotate about the rotational axis 62 relative to the soil within the field. For instance, as shown in FIG. 3, when at the working position, the disk blades 46 may penetrate the soil surface 70 to a given penetration depth 72. However, in alternative embodiments, the disk gang 44 may have any other suitable configuration.

Additionally, as shown in FIG. 3, the system 100 may also include a rotational actuator 102 (e.g., a hydraulic motor or electric motor) configured to rotationally drive the disk blades 46 about their rotational axis 62. Specifically, in the illustrated embodiment, the rotational actuator 102 is coupled to the disk gang shaft 64 at one of its ends (e.g., the second lateral end 68) such that the rotational actuator 102 is configured to rotationally drive the disk blades 46 by driving the common shaft 64 coupled to the blades 46. As will be described below, the rotational output (e.g., torque, rotational speed, and/or the like) of the rotational actuator 102 may be adjusted (e.g., by adjusting the amperage/voltage or the flow of hydraulic fluid supplied thereto) such that the disks 46 are driven at a predetermined rotational speed relative to the soil in the field.

Referring specifically now to FIG. 4, the basket 54 may be configured to be rotatably coupled to a toolbar or frame member 38 of the implement frame 28 such that the basket 54 may rotate relative to the ground about a rotational axis 74. Specifically, in several embodiments, the basket 54 may include a first end cap 76 rotatably coupled to the frame member 38 at a first end 78 of the basket 54. Furthermore, the basket 54 may include a second end cap 80 rotatably coupled to the frame member 38 at a second end 82 of the basket 54, with the second end 82 being spaced apart from the first end 78 along the rotational axis 74. A plurality of bars or rods 84 may extend between the first and second end caps 76, 80 along the rotational axis 74, with such bars/rods 84 being configured to break up soil clods on the soil surface 70. Moreover, in one embodiment, the first end cap 76 may be rotatably coupled to the frame member 38 by a first basket spindle or shaft 86 extending along the rotational axis 74. Similarly, the second end cap 80 may be rotatably coupled to the frame member 38 by a second basket spindle or shaft 88 extending along the rotational axis 74. Thus, as the implement 10 is moved across a field with the basket 54 positioned at its lowered or working position, the basket 54 may be configured to contact and/or exert a pressure on the soil surface 70 of the field and rotate about the rotational axis 74 relative to the soil within the field. However, in alternative embodiments, the basket 54 may have any other suitable configuration. For example, in one embodiment, the first and second end caps 76, 80 may be rotatably coupled to the frame member 38 by a single basket shaft (not shown).

Furthermore, as shown in FIG. 4, the system 100 may also include a rotational actuator 102 (e.g., a hydraulic motor or electric motor) configured to rotationally drive the basket 54 about its rotational axis 74. Specifically, in the illustrated embodiment, the rotational actuator 102 is coupled to a shaft (e.g., the first basket shaft 86) on which the basket 54 is rotatably mounted such that the rotational actuator 102 is configured to rotationally drive the basket 54 by driving the shaft coupled to the basket 54. As will be described below, the rotational output (e.g., the torque, rotational speed, and/or the like) of the rotational actuator 102 may be adjusted (e.g., by adjusting the amperage/voltage or the flow of hydraulic fluid supplied thereto) such that the baskets 54 are driven at a predetermined rotational speed relative to the soil in the field.

Figure 5:
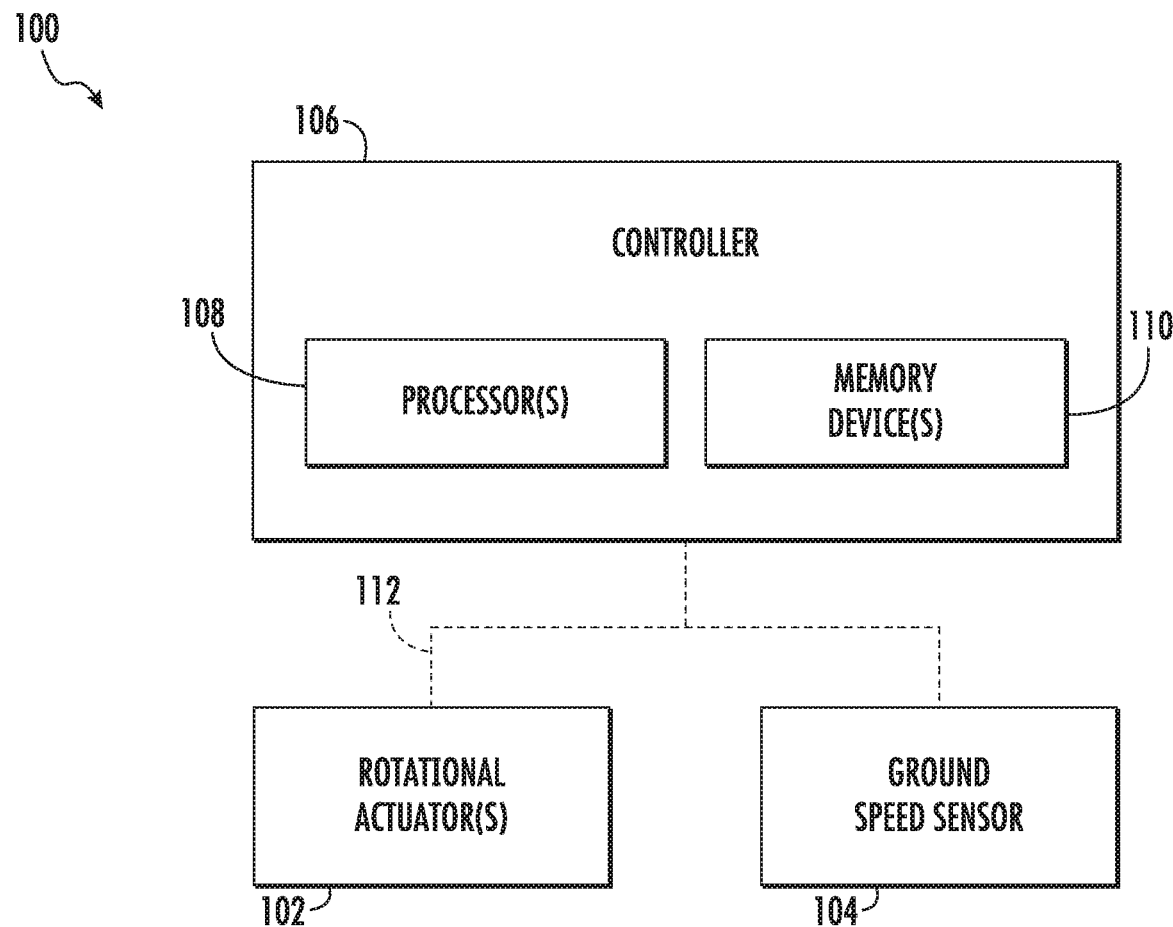
FIG. 5 illustrates a schematic view of one embodiment of a system for rotationally driving ground engaging tools of an agricultural implement in accordance with aspects of the present subject matter.

Referring now to FIG. 5, a schematic view of one embodiment of a system 100 for rotationally driving ground engaging tools of an agricultural implement is illustrated in accordance with aspects of the present subject matter. In general, the system 100 will be described herein with reference to the implement 10 described above with reference to FIGS. 1 and 2, as well as the disk gang 44, the basket 54, and various system components shown in FIGS. 3 and 4. However, it should be appreciated by those of ordinary skill in the art that the disclosed system 100 may generally be utilized with agricultural implements having any other suitable implement configuration and/or with rotating ground engaging tools having any other suitable tool configuration.

As shown in FIG. 5, the system 100 may include a ground speed sensor 104 provided in operative association with the implement 10 and/or the vehicle 12. In general, the ground speed sensor 104 may be configured to capture data indicative of the ground speed at which the vehicle/implement 10/12 moves across the field. For example, in one embodiment, the ground speed sensor 104 may be configured as a Hall Effect sensor configured to detect the rotational speed of an output shaft (not shown) of the transmission 26 of the vehicle 12. In another embodiment, the ground speed sensor 104 may correspond to a location sensor or positioning device configured to detect the current location of the implement 10 and/or the vehicle 12 using a satellite navigation positioning system (e.g. a GPS system, a Galileo positioning system, the Global Navigation satellite system (GLONASS), the BeiDou Satellite Navigation and Positioning system, and/or the like). However, in alternative embodiments, the ground speed sensor 104 may correspond to any suitable sensor or sensing device for detecting the ground speed of the implement/vehicle 10/12.

In accordance with aspects of the present subject matter, the system 100 may include a controller 106 positioned on and/or within or otherwise associated with the implement 10 or the vehicle 12. In general, the controller 106 may comprise any suitable processor-based device known in the art, such as a computing device or any suitable combination of computing devices. Thus, in several embodiments, the controller 106 may include one or more processor(s) 108 and associated memory device(s) 110 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 110 of the controller 106 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 110 may generally be configured to store suitable computer-readable instructions that, when implemented by the processor(s) 108, configure the controller 106 to perform various computer-implemented functions.

In addition, the controller 106 may also include various other suitable components, such as a communications circuit or module, a network interface, one or more input/output channels, a data/control bus and/or the like, to allow controller 106 to be communicatively coupled to any of the various other system components described herein (e.g., the rotational actuator(s) 102 and the ground speed sensor 104). For instance, as shown in FIG. 5, a communicative link or interface 112 (e.g., a data bus) may be provided between the controller 106 and the components 102, 104 to allow the controller 106 to communicate with such components 102, 104 via any suitable communications protocol (e.g., CAN-BUS).

It should be appreciated that the controller 106 may correspond to an existing controller(s) of the implement 10 and/or the vehicle 12, itself, or the controller 106 may correspond to a separate processing device. For instance, in one embodiment, the controller 106 may form all or part of a separate plug-in module that may be installed in association with the implement 10 and/or the vehicle 12 to allow for the disclosed systems to be implemented without requiring additional software to be uploaded onto existing control devices of the implement 10 and/or the vehicle 12. It should also be appreciated that the functions of the controller 106 may be performed by a single processor-based device or may be distributed across any number of processor-based devices, in which instance such devices may be considered to form part of the controller 106. For instance, the functions of the controller 106 may be distributed across multiple application-specific controllers, such as an engine controller, a transmission controller, an implement controller, and/or the like.

In several embodiments, the controller 106 may be configured to determine the ground speed at which the implement 10 is being moved across the field. As indicated above, the system 100 may include a ground speed sensor 104 configured to capture data indicative of the ground speed ground speed at which the implement 10 is being moved across the field. In this regard, the controller 106 may be configured to receive data from the ground speed sensor 104 (e.g., via the communicative link 112). Thereafter, the controller 106 may be configured to analyze/process the received data to determine the current ground speed of the implement 10. For instance, the controller 106 may include a look-up table(s), suitable mathematical formula, and/or algorithms stored within its memory 110 that correlates the received data to the current ground speed of the implement 10.

Additionally, the controller 106 may be configured to determine a rotational output for a rotational actuator 102 coupled to one or more ground engaging tools (e.g., one or more disk blades 46 and/or baskets 54) of the agricultural implement based on the current ground speed of the implement. As indicated above, it is desirable that the ground engaging tool(s) of the implement 10 to rotate at a predetermined rotational speed relative to the soil within the field during the performance of an agricultural operation (e.g., a tillage operation). In this regard, the ground engaging tool(s) may rotate (without being rotationally driven by the rotational actuator(s) 102) at the predetermined rotational speed when the implement 10 is traveling across the field at a particular ground speed (e.g., six miles per hour). However, in certain instances, the conditions of the field may necessitate that the implement 10 be moved across the field at a different ground speed. For example, when the field is muddy, it may be necessary to move that the implement 10 be moved across the field at a slower ground speed (e.g., four miles per hour) to prevent plugging of or material accumulation on the ground engaging tool(s). As such, the controller 106 may be configured to determine or select a rotational output for the rotational actuator 102 based on the determined current ground speed of the implement 10 such that the ground engaging tool(s) rotates at the predetermined rotational speed relative to soil within the field. Moreover, the determined rotational output(s) of the rotational actuator(s) may be adjusted as the current ground speed of the implement 10 changes such that rotational speed of the ground engaging tool(s) is maintained at the predetermined rotational speed (or within a predetermined range of rotational speeds).

It should be appreciated that the rotational output of the rotational actuator 102 may correspond to any suitable rotational output parameter or characteristic of the actuator 102. For example, in one embodiment, the rotational output may correspond to the torque output of the rotational actuator 102. In another embodiment, the rotational output may correspond to the rotational speed of an output shaft (not shown) of the rotational actuator 102. However, in alternative embodiments, the rotational output may correspond to any other suitable rotational output parameter/characteristic.

Furthermore, it should be appreciated that the rotational output of the rotational actuator 102 may be determined or selected such that the cumulative effect of the rotational drive force provided by the actuator 102 on the ground engaging tool(s) and the friction generated by the engagement of the tool(s) with the soil results in the tool(s) rotating at the predetermined rotational speed. More specifically, friction may be generated between the ground engaging tool(s) of the implement 10 and the soil as the implement 10 is moved across the field to perform the agricultural operation. Such friction may, in turn, cause the ground engaging tool(s) to rotate relative to the soil. In this regard, the rotational output of the rotational actuator 102 in combination with the friction driving of the ground engaging tool(s) may result in the tool(s) rotating at the predetermined rotational speed set for the agricultural operation being performed. For example, as indicated above, in certain instances, the implement 10 may be moved across the field at four miles per hour when a ground speed of six miles per hour would result in the ground engaging tool(s) rotating at the predetermined rotational speed (without being rotationally driven by the rotational actuator 102). Thus, in such instances, the rotational output of the rotational actuator 102 may be determined/selected such that the ground engaging tool(s) rotate relative to the soil at the same rotational speed(s) as the tool(s) would if the implement 10 were being moved at six miles per hour.

Moreover, the controller 106 may be configured to determine a rotational output for a plurality of rotational actuators 102. As indicated above, in several embodiments, the implement 10 may include a rotational actuator(s) 102 configured to rotationally drive the disc blades 46 mounted on the disk gang(s) 44 of the implement 10. Additionally, the implement 10 may include a rotational actuator(s) 102 configured to rotationally drive the basket(s) 54 of the implement 10. In this regard, the controller 106 may be configured to determine or select a rotational output(s) for the rotational actuator(s) 102 rotationally driving the disk gang(s) 44 such that the disk blades 46 rotate at a first rotational speed relative to the soil. Furthermore, the controller 106 may be configured to determine or select a rotational output(s) for the rotational actuator(s) 102 rotationally driving the basket(s) 54 such that the basket(s) 54 rotate at a second rotational speed relative to the soil. In one embodiment, the first and second rotational speeds may be same such that the disk blades 46 and the basket(s) 54 rotate at the same speed. However, in another embodiment, the first and second rotational speeds may be different such that the disk blades 46 and the basket(s) 54 rotate at different speeds.

In accordance with aspects of the present subject matter, the controller 106 may be configured to control the operation of the rotational actuator(s) 102 such that the rotational actuator(s) 102 provides the determined rotational output(s) to the ground engaging tool(s) while the tool(s) is disposed at a working position relative to a soil surface of a field. Specifically, in several embodiments, when the tool(s) is disposed at its working position relative to the soil surface of the field, the controller 106 may be configured to transmit suitable control signals to the rotational actuator(s) (e.g., via the communicative link 112). Such control signals may, in turn, instruct the actuator(s) 102 to provide the determined/selected rotational output(s). Thereafter, upon receipt of the control signals, the rotational actuator(s) 102 may operate in a manner that provides the determined/selected rotational output(s) to the ground engaging tools (e.g., via the shaft 64 and/or the shaft 86). As described above, the rotational output(s) in combination with the friction generated by the interaction of the ground engaging tool(s) with the soil may result in the tool(s) rotating the predetermined rotational speed(s) while such tool(s) is disposed at its working or ground engaging position.

Figure 6:
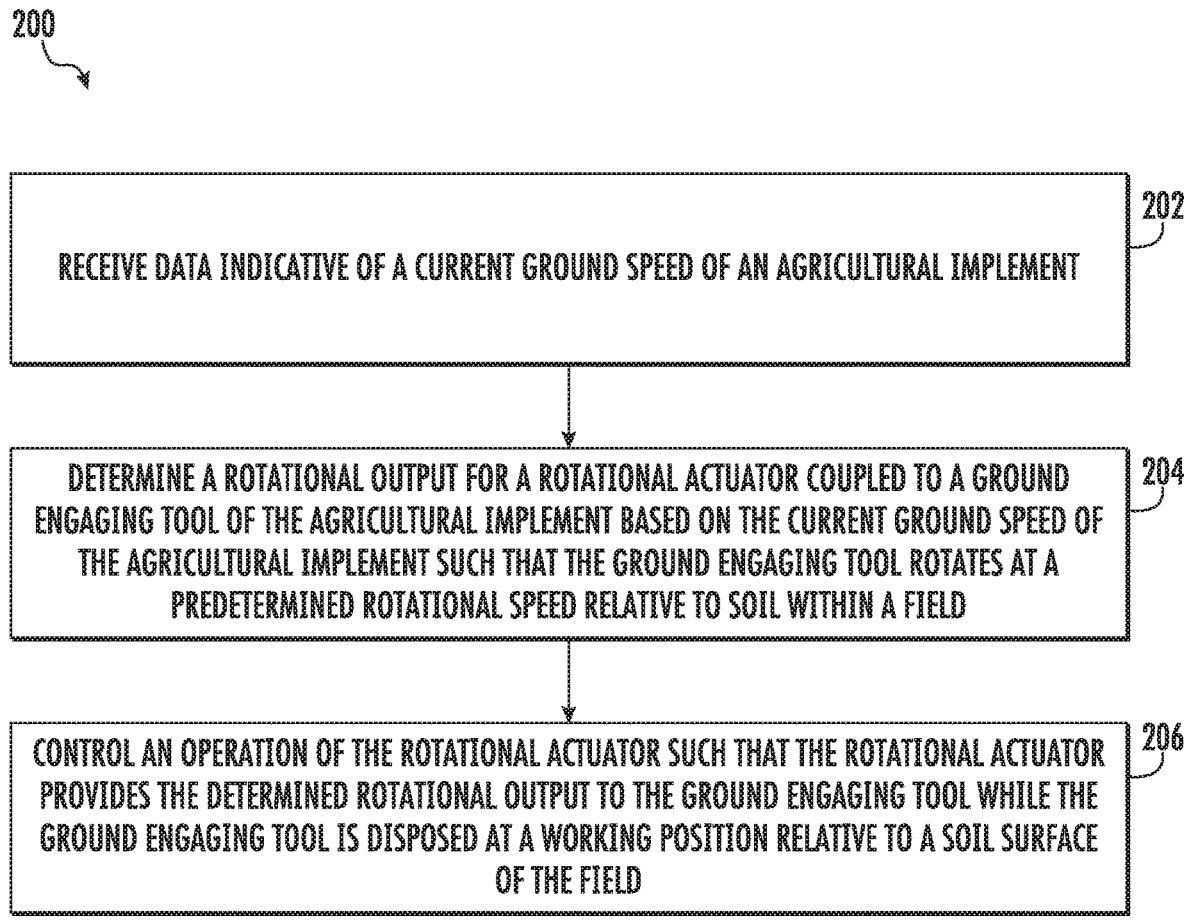
FIG. 6 illustrates a flow diagram of one embodiment of a method for rotationally driving ground engaging tools of an agricultural implement in accordance with aspects of the present subject matter.

Referring now to FIG. 6, a flow diagram of one embodiment of a method 200 for rotationally driving ground engaging tools of an agricultural implement is illustrated in accordance with aspects of the present subject matter. In general, the method 200 will be described herein with reference to the agricultural implement 10, the disk gang 44, the basket 54, and the system 100 described above with reference to FIGS. 1-5. However, it should be appreciated by those of ordinary skill in the art that the disclosed method 200 may generally be executed with any agricultural implement having any suitable implement configuration, any set of rotating ground engaging tools having any suitable tool configuration, and/or any system having any suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (202), the method 200 may include receiving, with one or more computing devices, data indicative of a current ground speed of an agricultural implement. For instance, as described above, the controller 106 may be configured to receive data indicative of a current ground speed of an agricultural implement 10 from a ground speed sensor 104 provided in operative association with the implement 10 or an associated work vehicle 12.

Additionally, at (204), the method 200 may include determining, with the one or more computing devices, a rotational output for a rotational actuator coupled to a ground engaging tool of the agricultural implement based on the current ground speed of the agricultural implement such that the ground engaging tool rotates at a predetermined rotational speed relative to soil within the field. For instance, as described above, the controller 106 may be configured to determine a rotational output for a rotational actuator 102 coupled to a ground engaging tool (e.g., a disk blade 46 and/or a basket 54) of the agricultural implement 10 based on the current ground speed of the implement 10 such that the tool rotates at a predetermined rotational speed relative to soil within the field.

Moreover, as shown in FIG. 6, at (206), the method 200 may include controlling, with the one or more computing devices, an operation of the rotational actuator such that the rotational actuator provides the determined rotational output to the ground engaging tool while the ground engaging tool is disposed at a working position relative to a soil surface of a field. For instance, as described above, the controller 106 may be configured to control the operation of the rotational actuator 102 such that the rotational actuator 102 provides the determined rotational output to the ground engaging tool while the ground engaging tool is disposed at a working position relative to a soil surface of a field.

It is to be understood that the steps of the method 200 are performed by the controller 106 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 106 described herein, such as the method 200, is implemented in software code or instructions which are tangibly stored on a tangible computer readable medium. The controller 106 loads the software code or instructions via a direct interface with the computer readable medium or via a wired and/or wireless network. Upon loading and executing such software code or instructions by the controller 106, the controller 106 may perform any of the functionality of the controller 106 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for rotationally driving ground engaging tools of an agricultural implement, the system comprising:
 a ground engaging tool configured to be supported relative to a frame of an agricultural implement;
 a rotational actuator configured to rotationally drive the ground engaging tool about a rotational axis;
 a sensor configured to capture data indicative of a ground speed of the agricultural implement; and
 a controller communicatively coupled to the rotational actuator and the sensor, the controller configured to:
  determine a current ground speed of the agricultural implement based on data received from the sensor;
  determine a rotational output for the rotational actuator based on the current ground speed of the agricultural implement such that the ground engaging tool rotates at a predetermined rotational speed relative to soil within a field; and
  control an operation of the rotational actuator such that the rotational actuator provides the determined rotational output to the ground engaging tool while the ground engaging tool is disposed at a working position relative to a soil surface of the field.

2. The system of claim 1, wherein the ground engaging tool comprises a disk blade mounted on a shaft extending axially along the rotational axis.

3. The system of claim 2, wherein the rotational actuator is rotatably coupled to the shaft such that the rotational actuator is configured to rotationally drive the disk blade by rotating the shaft.

4. The system of claim 1, wherein the ground engaging tool comprises a basket mounted on a shaft extending axially along the rotational axis.

5. The system of claim 4, wherein the rotational actuator is rotatably coupled to the shaft such that the rotational actuator is configured to rotationally drive the basket by rotating the shaft.

6. The system of claim 1, wherein the rotational actuator comprises one of a hydraulic motor or an electric motor.

7. An agricultural implement, comprising:
 a frame;
 first and second ground engaging tools supported relative to the frame,
 a first rotational actuator configured to rotationally drive the first ground engaging tool about a first rotational axis;
 a second rotational actuator configured to rotationally drive the second ground engaging tool about a second rotational axis, the second rotational axis being different than the first rotational axis;
 a sensor configured to capture data indicative of a ground speed of the agricultural implement; and a controller communicatively coupled to the first rotational actuator, the second rotational actuator, and the sensor, the controller configured to:
  determine a current ground speed of the agricultural implement based on data received from the sensor;
  control an operation of the first rotational actuator based on the current ground speed to rotationally drive the first ground engaging tool such that the first ground engaging tool rotates at a first rotational speed relative to soil within a field; and
  control an operation of the second rotational actuator based on the current ground speed to rotationally drive the second ground engaging tool such that the second ground engaging tool rotates at a second rotational speed relative to soil within the field,
wherein the first and second ground engaging tools are rotationally driven by the first and second rotational actuators, respectively, while the first and second ground engaging tools are disposed at respective working positions relative to a soil surface of the field.

8. The agricultural implement of claim 7, wherein the first rotational speed is the same as the second rotational speed.

9. The agricultural implement of claim 7, wherein the first rotational speed is different than the second rotational speed.

10. The agricultural implement of claim 7, wherein the first ground engaging tool comprises a disk blade and the second ground engaging tool comprises a basket.

11. The agricultural implement of claim 10, wherein the disk blade comprises one of a plurality of disk blades ganged together via a common shaft extending axially along the first rotational axis.

12. The agricultural implement of claim 11, wherein the first rotational actuator is rotatably coupled to the common shaft such that the first rotational actuator is configured to rotationally drive the plurality of disk blades by rotating the common shaft.

13. The agricultural implement of claim 10, wherein the basket is rotatably mounted on a basket shaft extending axially along the second rotational axis.

14. The agricultural implement of claim 13, wherein the second rotational actuator is rotatably coupled to the basket shaft such that the second rotational actuator is configured to rotationally drive the basket by rotating the basket shaft.

15. The agricultural implement of claim 7, wherein the rotational actuator comprises one of a hydraulic motor or an electric motor.

16. A method for rotationally driving ground engaging tools of an agricultural implement, the agricultural implement including a frame and a ground engaging tool configured to be supported relative to the frame, the method comprising:
  receiving, with one or more computing devices, data indicative of a current ground speed of the agricultural implement;
  determining, with the one or more computing devices, a rotational output for a rotational actuator coupled to the ground engaging tool based on the current ground speed of the agricultural implement such that the ground engaging tool rotates at a predetermined rotational speed relative to soil within a field; and
  controlling, with the one or more computing devices, an operation of the rotational actuator such that the rotational actuator provides the determined rotational output to the ground engaging tool while the ground engaging tool is disposed at a working position relative to a soil surface of the field.

17. The method of claim 16, wherein the ground engaging tool comprises a disk blade.

18. The method of claim 16, wherein the ground engaging tool comprises a basket.

19. The method of claim 16, wherein the rotational actuator comprises one of a hydraulic motor or an electric motor.

* * * * *